United States Patent [19]
Kangas

[11] Patent Number: 5,209,937
[45] Date of Patent: * May 11, 1993

[54] INSERT FOR BARREL EXTRUDERS

[76] Inventor: Waino J. Kangas, P.O. Box 502, Milford, Del. 19963

[*] Notice: The portion of the term of this patent subsequent to Oct. 8, 2008 has been disclaimed.

[21] Appl. No.: 864,504

[22] Filed: Apr. 7, 1992

Related U.S. Application Data

[63] Continuation-in-part of Ser. No. 772,209, Oct. 7, 1991, abandoned, which is a continuation-in-part of Ser. No. 627,974, Dec. 17, 1990, Pat. No. 5,054,932.

[51] Int. Cl.$^5$ .............................................. B29C 47/82
[52] U.S. Cl. ..................................... 425/183; 366/84; 366/149; 425/192 R; 425/204; 425/378.1
[58] Field of Search ............................. 366/76, 83–85, 366/144, 147, 149, 154–157; 425/183, 192 R, 200, 204, 205, 378.1

[56] References Cited

U.S. PATENT DOCUMENTS

| | | | |
|---|---|---|---|
| 3,416,774 | 12/1968 | Fritsch | 366/147 |
| 4,117,583 | 10/1978 | Gnädig et al. | 366/83 |
| 4,235,581 | 11/1980 | Anders | 425/378.1 |
| 4,385,876 | 5/1983 | Scherping et al. | 366/85 |
| 4,415,268 | 11/1983 | Brinkmann et al. | 366/149 |
| 4,643,660 | 2/1987 | Capelle | 425/190 |
| 4,702,695 | 10/1987 | Blach | 366/83 |

Primary Examiner—David A. Simmons
Assistant Examiner—William J. Matney, Jr.
Attorney, Agent, or Firm—John S. Munday

[57] ABSTRACT

A segmented barrel extruder device for extrusion and having a plurality of segments enclosing an extruder barrel aligned on an axis. The segments include axially perpendicular rectangular end flanges having exposed sides and a central portion for housing an extruder barrel. The flanges have aligned straight line paths for fluid flow in a plane perpendicular to the axis. Accordingly, the paths each intersect two exposed sides without intersecting the central portion. The segments also include an extruder barrel between flanges. The segments have a housing having straight axial channels which are connected to the paths in the flanges to conduct fluid from points along one path in each path to of points along a corresponding path. The barrel extruder also includes a centered portion aligned with the flange central portion. There is also provided an extruder barrel insert sized to fit in the centered portion of the barrel having a key for preventing rotational movement. The insert has extruder bores for engagement with a screw and has high resistance to wear compared to the wear resistance of the extruder barrel. Finally, the device includes an inlet and an outlet for fluid flow.

9 Claims, 3 Drawing Sheets

INSERT FOR BARREL EXTRUDERS

FIELD OF THE INVENTION

This application is a continuation-in-part of my pending application having Ser. No. 07/772,209, filed Oct. 7, 1991 now abandoned, which in turn is a continuation-in-part of my application 07/627,974, filed Dec. 17, 1990, now U.S. Pat. No. 5,054,932.

The present invention relates to an improved segmented barrel extruder device, and more particularly to a device for extruding along a longitudinal axis. More specifically, the invention relates to an improvement in the extruder barrel by providing a barrel insert which substantially improves operational economics and efficiencies.

BACKGROUND OF THE INVENTION

Machines for plastic compounding have existed for many years now, and have progressed through many generations of development as technology improves and as plastic formulations change and place new demands on the compounding equipment. During this development, it has becomes technically and economically desirable to operate continuous processes.

For example, most production from linear low density polyethylene includes a continuous extruder machine. Polypropylene and EPDM, PVC (both rigid and flexible), thermoplastic rubbers, EVA, PE generally, and specialty formulations for video discs and records are other examples of compounding successes on continuous extruder machines.

The most effective continuous extruder designs are those which employ a twin screw extruder which is self cleaning and able to provide high capacity. The most efficient systems allow for multiple formulations to be processed on the same extruder, with the opportunity to customize the twin screw alignment for particular needs. Also used in some specific situations are single screw extruder, when the chemical and physical properties of the product require that treatment.

As is well known, chemical reactions in general and plastic production specifically needs to be controlled so that the reaction rate is maximized without adverse side effects. Thus heating and cooling functions are required, to maintain the plastics at a maximum efficiency. However, it is in this area that machines for continuous extrusion of plastics and the like have their most difficulties.

For example, polyethylene may be extruded at 200° to 250° F., while nylon is processed at about 650° F. In both cases, excessive heat will cause degradation of the expected properties, while low heat will lead to longer reaction times or incomplete reactions. Each chemical system has its own needs, as some are strongly exothermic while others need heat to be added to drive the reaction. Sometimes, the fillers, coloring agents, flame retardants and the like call for special temperature considerations. Thus the extruder must meet a wide range of operating conditions if it is to be useful over any reasonable range of products.

Heating can be accomplished with electric heaters, steam or hot oil, for example, while cooling is done with water or air. It is also possible to control temperature by controlling the rate of the extruder screws, so that faster or slower rates enhance or retard exothermic or endothermic conditions as needed. Nevertheless, there presently does not exist an extruder system which can accommodate any significant part of the total market, particularly where different temperature conditions must be met for each varied chemistry.

Conventional extruder technology is not capable of accommodating the wide range of temperature conditions in a single machine. Of course, the requirements of any particular chemistry can be designed into a machine system, but the likelihood of that machine being usable for other systems is small. Thus it would be a great advance in the art if an extruder system could be provided which would operate over a wide range of temperature ranges, both for heating and cooling.

Presently, heater bands are wrapped around the segments of an extruder system, so that heat can be applied electrically at desired locations. These heaters provide a heat for melting, mixing and driving the reaction. Electric heat is effective in most systems but is limited by the specific design which is installed on any given unit. By this is meant that electric heating might be installed for a particular temperature and heat exchange range of conditions, but that unit might not be usable for other conditions.

Under these circumstances, additional heating is provided, usually be stream or hot oil. This form of heat requires that there be access to the region near the extruder path in order to be effective. To date, no effective system has been provide to accommodate this need.

Cooling in the present generation of extruder machines is done by a number of somewhat effective but not perfect designs. Single screw extruders are actually thick walled piping, and cooling is applied by wrapping a spiral coil around the pipe. Heat transfer is effected in a spiral path, but this has been found to be generally acceptable for single screw units.

Double screw extruders are much more complicated, of course, and spiral wrapping of cooling coils has not been nearly as effective in providing fast, direct cooling to the product as it is carried, mixed, and reacted by the twin screw design. In addition, twin screw or double screw extruders achieve substantially greater mixing per unit of length, so that both cooling and heating control needs to be faster or more precise.

Still, the only method used by the prior art is to wrap the double screw segments with heater bands. Cooling as also achieved by direct contact with the outside of the barrel segment. This does not present an even temperature profile to the mixing and extrusion zones. Thus mixing rates, reaction conditions and overall process efficiencies are limited more by the temperature control than by the capabilities of the extruder itself.

A major problem in extruder devices, and particularly in those extruder devices which are used for extruding formulations which contain fiberglass and other abrasive materials is that the barrel wears out. The action of the single or double screw extruders at controlled but elevated temperatures destroys ordinary metal extruder barrels. Often times, corrosion and contamination of the barrels makes it impossible to clean the inside of the barrel. Thus, no matter what care is given to the extruder screws, or if they are replaced with clean or uncorroded screws, the device becomes useless because the barrel is non-functional.

Particularly when temperature control is not ideal, such as in prior art design, the extruder barrel will become inoperative or difficult to use due to contamination and corrosion in a short period of time. This causes excessive down time and loss of profits. Similarly, when the barrel becomes worn, seals are damaged and tolerances are lost, thereby also leading to increased down time and losses.

Yet another major difficulty in manufacturing and using extruder devices is the extremely long time required to adequately coat the inside of the extruder barrel to protect against wear and/or corrosion. In instances when the most efficient way to protect the interior surface of a barrel is to use a method and apparatus known in the trade as a detonation gun process, intricate designs of barrel extruders prevents application of the appropriate coating except where there is line of sight between the detonation gun and the workpiece.

Accordingly, it is a primary object of this invention to provide an efficient and effective heating and cooling system for extruder devices, in which heating and cooling can be accomplished over the widest range possible, to permit much greater use of the extruder on a wider variety of formulations.

Another object of the present invention is to provide an extruder barrel which can be treated with conventional processes for surface treatment, such as detonation gun process applications of thermal spray coatings.

Yet another object of the present invention is to provide an extruder device which is easy to assemble, easy to clean, functions with the new heating and cooling system which I have developed.

Still another object of the present invention is to provide an improved extruder barrel which is capable of resisting corrosive and abrasive forces in a way not heretofore possible to attain.

Other objects will appear herein.

SUMMARY OF THE INVENTION

It has now been discovered that the above and other objects of the present invention may be accomplished in the following manner. Specifically, a new segmented barrel extruder device for extrusion along a longitudinal axis has been discovered. The device has a plurality of segments enclosing a barrel aligned on that axis.

The segmented barrel extruder device of the present invention is designed for extrusion along a longitudinal axis. The device has a plurality of segments enclosing an extruder barrel aligned on the longitudinal axis.

The segments comprise a pair of axially perpendicular rectangular end flanges for each segment and having exposed sides and a central portion for housing the extruder barrel. Each end flange has a plurality of aligned straight line paths for fluid flow into and out of the flange in a plane perpendicular to the longitudinal axis. Each straight line path intersects two exposed sides without intersecting the central portion. Port means provide access for fluid flow to each straight line path from at least one of said sides of said flange.

The device also includes an extruder barrel between each of said pair of flanges for enclosing an extruder means. An outer housing has a plurality of straight axial channels connected to the straight line paths to conduct fluid from one path to a corresponding path in the other of said pair. The barrel further includes an axially centered portion aligned with said central portion of said flanges.

Inside the axially centered portion of the barrel is an extruder barrel insert having means for preventing rotational movement of said insert. Key means are preferred. The insert has at least one extruder bore for engagement with an extruder screw and has high resistance to wear compared to the wear resistance of said extruder barrel.

Finally, the device includes an inlet and an outlet for transferring fluid from selective straight line paths and straight axial channels though the port means.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
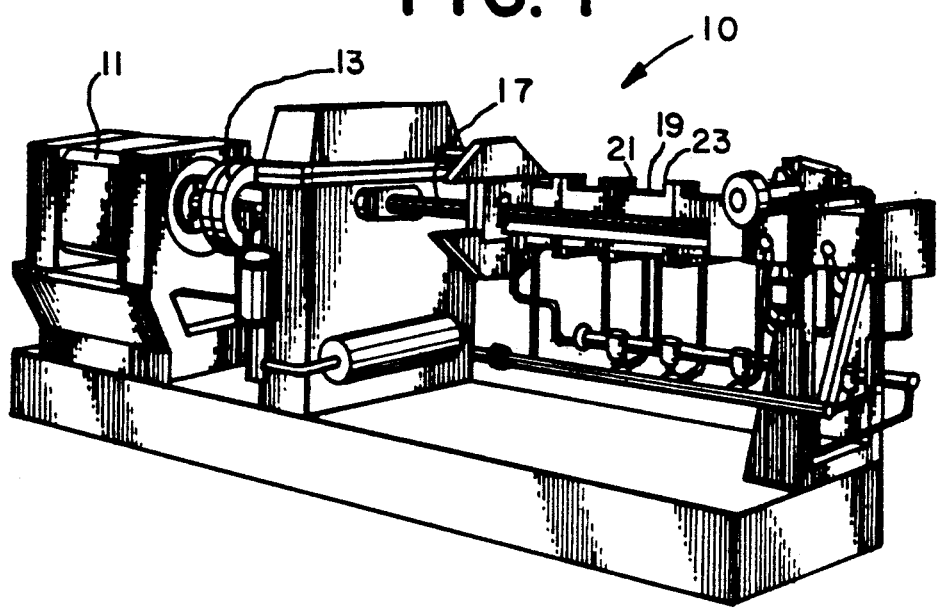
FIG. 1 is a schematic, perspective view showing the overall location of the device of the present invention in its intended place of operation.

As shown in FIG. 1, an extruder device generally identified as 10 has a drive motor 11, a clutch 13 and a gear system 15 which powers and drives the extruder. The particular formulation is fed into the extruder and is mixed, reacted and extruded by a pair of extruder screws 17. The extruder screws 17 move the formulation through a series of segments 19.

Figure 2:
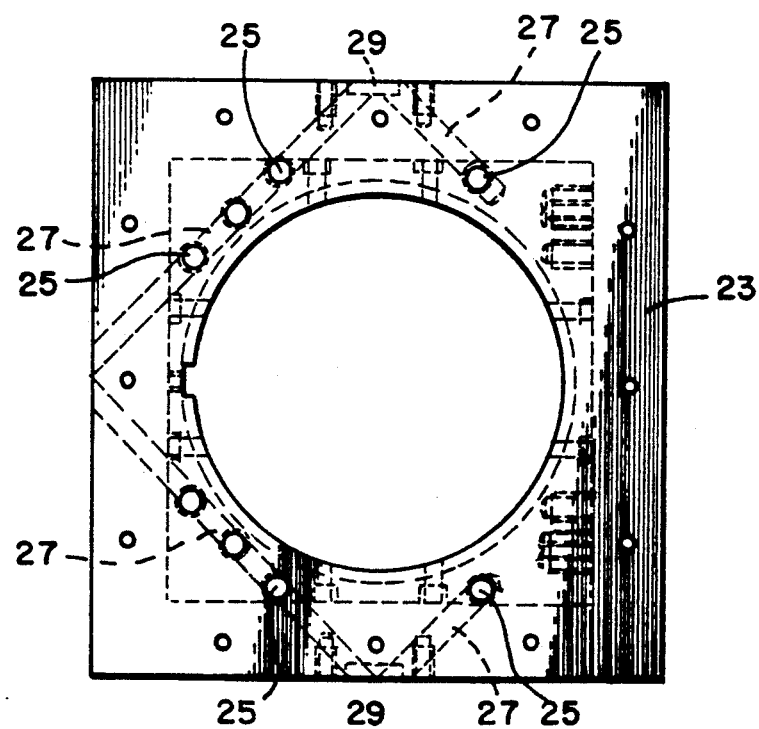
FIG. 2 is an end elevational, sectional view of one flange into which the preferred embodiment of the present invention is placed.

Segments 19 include a pair of flanges 21 and 23, each being located on one end of segment 19. Flange 23, shown in FIG. 2, has a central portion which is sized to accommodate a double screw self-wiping extruder. Flange 23 has a plurality of straight line paths 27, extending into and out of the flange 23 in a plane which is perpendicular to the axis.

Paths 27 intersect at least three sides of flange 23 and include ports 29 respectively. Each port 29 provides access to each straight line path 27 with the corresponding side of the next flange. Having a straight line path 27 and having access to the path 27 with a port 29 provides an important advantage, whereby cleaning, de-scaling, unplugging and other maintenance functions can be performed. This feature provides for a segment useful life which is several times greater than other designs. The economies are substantial.

It is possible to provide a fourth side with a port, similar to the other ports. This fourth port provides a design in which there are four quadrants, so that fluid can flow for heating or cooling through all four or through each quadrant separately.

Channels 25 are positioned adjacent to all sides of the flange 23 are aligned radially outward from the center axis. Channels 25 are operably connected to flanges 21 and 23 through the extruder barrel housing 31 so that they intersect and communicate with paths 27. Channels 25 are preferably aligned from a plurality of points on flange 23 to a corresponding plurality of points on flange 21.

Channels 25 not only communicate with paths 27 in each flange 21 and 23 of each segment 19, channels 25 can also communicate with channels in adjacent segments, so that a wide variety of flow paths are possible. In this embodiment, cleaning of the axial channels is also easy, and scale, corrosion or sediment can be frequently removed, keeping the heat transfer coefficient relatively constant. This, of course, permits more uniform production conditions.

Fluid can be introduced at either the upstream end and flow downstream, or the reverse is equally possible. In addition, fluid can be introduced in each downstream flange 23 and removed from the corresponding upstream flange 21, for example, to permit greater temperature differential between the channels 25 and the extruder barrel 31. Flow in the various quadrants can be simultaneously counterflowing, or they can all flow in the same direction. The flexibility of the present invention is remarkably broad.

As the fluid travels from flange 23 to flange 21, heat transfer takes place with that portion of barrel housing 31 which forms part of segment 19. Replacement of the fluid in the next segment will keep the temperature differential at a maximum.

Figure 3:
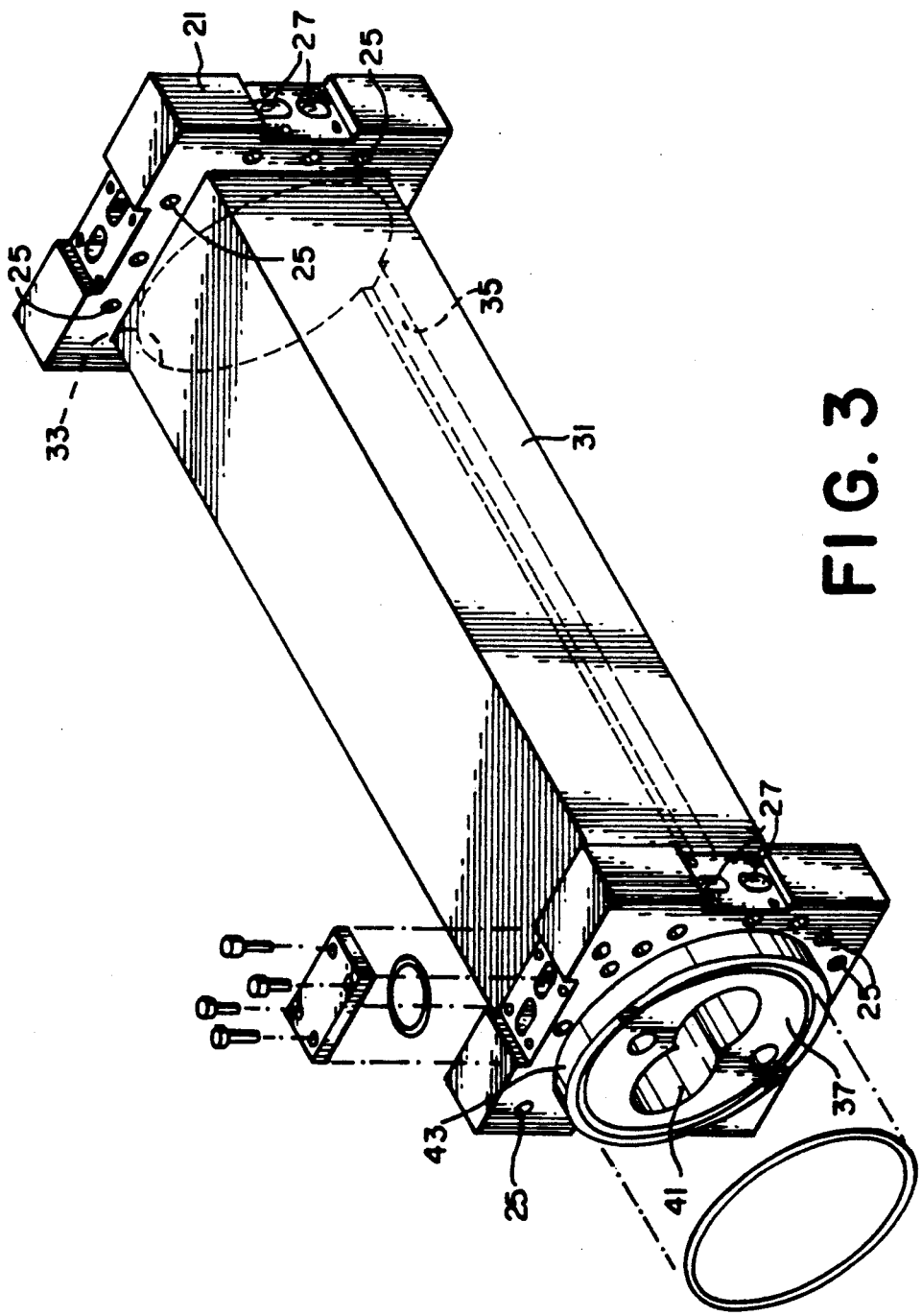
FIG. 3 is a perspective view showing the extruder barrel.
Figure 4:
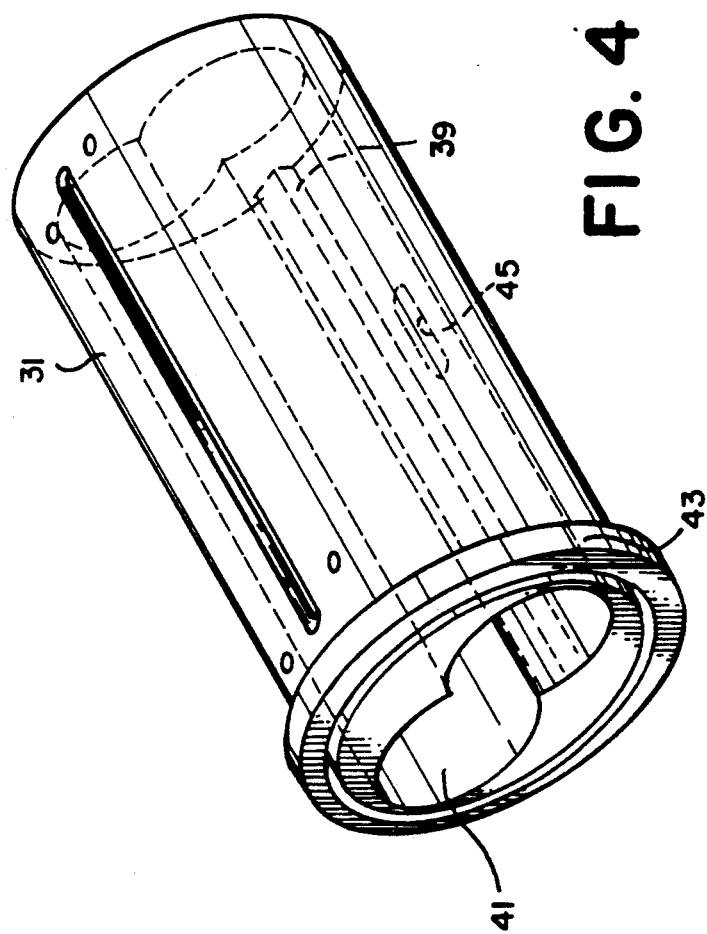
FIG. 4 is a perspective view showing the barrel insert of the preferred embodiment.

Shown in FIG. 3 and FIG. 4 is the use of an extruder barrel insert 37 which includes a key 39 for engagement with key slot 35 on the barrel insert housing 31. Extruder barrel insert 37 includes a hardened surface 41 which is to engage the screw members of the extrusion device.

Surface 41 may be hardened by heat treatment, chemical reaction, and other methods. Preferred is to use a coating process such as the detonation gun process in which coating powder is reacted with nitrogen, acetylene and oxygen to produce a thermal spray coating which is highly desirable in extrusion processes. Coatings may be from about 0.002 to 0.020 inches. Other coatings and treatments may be employed to reduce wear and prolong life of the device.

One particular advantage of the present invention is derived from the fact that the insert 37 is much smaller and easy to treat than the entire housing 31. Special alloys may be used, even those which are exotic and difficult to fabricate because the insert 37 is so much less complicated than the entire housing or systems of the prior art which are not compartmented.

In one preferred embodiment, the simple insert 37 is formed in two pieces, cut axially along the entire length of the insert. The coating or heat treating is completed, using direct line of sight impingement on all surfaces. The two halves are then fastened together, such as by welding or keying. No prior art system provides for such complete and accurate treatment of the surfaces such as surface 41 which contacts the materials being extruded.

While particular embodiments of the present invention have been illustrated and described herein, it is not intended to limit the invention. Changes and modifications may be made therein without departing from the following claims.

Having thus described the invention, what is claimed is:

1. A segmented barrel extruder device for extrusion along a longitudinal axis, said device having a plurality of segments enclosing an extruder barrel aligned on said longitudinal axis, said segments comprising:
a pair of axially perpendicular rectangular end flanges for each segment, each said pair of end flanges having exposed sides and a central portion for housing said extruder barrel, each said pair of end flanges having a plurality of aligned straight line paths for fluid flow into and out of said flanges in a plane perpendicular to said longitudinal axis, wherein said straight line paths each intersect two of said exposed sides without intersecting said central portion, and port means for providing access for fluid flow to each straight line path from at least one of said sides of said flange;
an extruder barrel between each of said pair of flanges for enclosing an extruder means, including an outer housing having a plurality of straight axial channels and connected to said straight line paths in said end flanges to conduct fluid from a plurality of points along one path in each of said straight line paths in one of said pair of end flanges to a plurality of points along a corresponding straight line path in the other of said pair, said barrel further including an axially centered portion aligned with said central portion of said flanges;
an extruder barrel insert sized to fit in said axially centered portion of said barrel and having means for preventing rotational movement of said insert, said insert having at least one extruder bore for engagement with an extruder screw and having high resistance to wear compared to the wear resistance of said extruder barrel; and
an inlet means and an outlet means for introducing fluid into and removing fluid from selective straight line paths and straight axial channels though said port means.

2. The device of claim 1, wherein said port means includes means for providing access to each of said straight line paths independently.

3. The device of claim 1, wherein said extruder barrel includes at least two extruder paths along said axis, said paths being formed by a double screw extruder.

4. The device of claim 3, wherein said port means includes means for providing access to each straight line path independently.

5. The device of claim 4, wherein said port means includes means for providing access to adjacent straight line paths simultaneously.

6. A segmented barrel extruder device for extrusion along a longitudinal axis having a plurality of segments enclosing an extruder barrel aligned on said longitudinal axis, comprising:
a pair of end flanges for each segment having exposed sides and a central portion for housing said extruder barrel and a plurality of aligned straight line paths for fluid flow into and out of said flanges in a plane perpendicular to said longitudinal axis, wherein said straight line paths each intersect two of said exposed sides without intersecting said central portion;
an extruder barrel between each of said pair of flanges including an outer housing having a plurality of straight axial channels and connected to said straight line paths in said end flanges to conduct fluid from a plurality of points along one path in each of said straight line paths in one of said pair of end flanges to a plurality of points along a corresponding straight line path in the other of said pair;
an extruder barrel insert sized to fit in said axially centered portion of said barrel keyed to prevent rotational movement of said insert, said insert having at least one extruder bore for engagement with an extruder screw and having high resistance to wear compared to the wear resistance of said extruder barrel; and
an inlet means and an outlet means including port means for introducing fluid into and removing fluid from selective straight line paths and straight axial channels.

7. The device of claim 6, wherein said port means includes means for providing access to each of said straight line paths independently.

8. The device of claim 6, wherein said extruder barrel includes at least two extruder paths along said axis, said paths being formed by a double screw extruder.

9. The device of claim 8, wherein said port means includes means for providing access to each straight line path independently.

* * * * *